No. 893,905. PATENTED JULY 21, 1908.
C. R. DODGE.
POTATO DIGGER.
APPLICATION FILED AUG. 27, 1906.
6 SHEETS—SHEET 1.
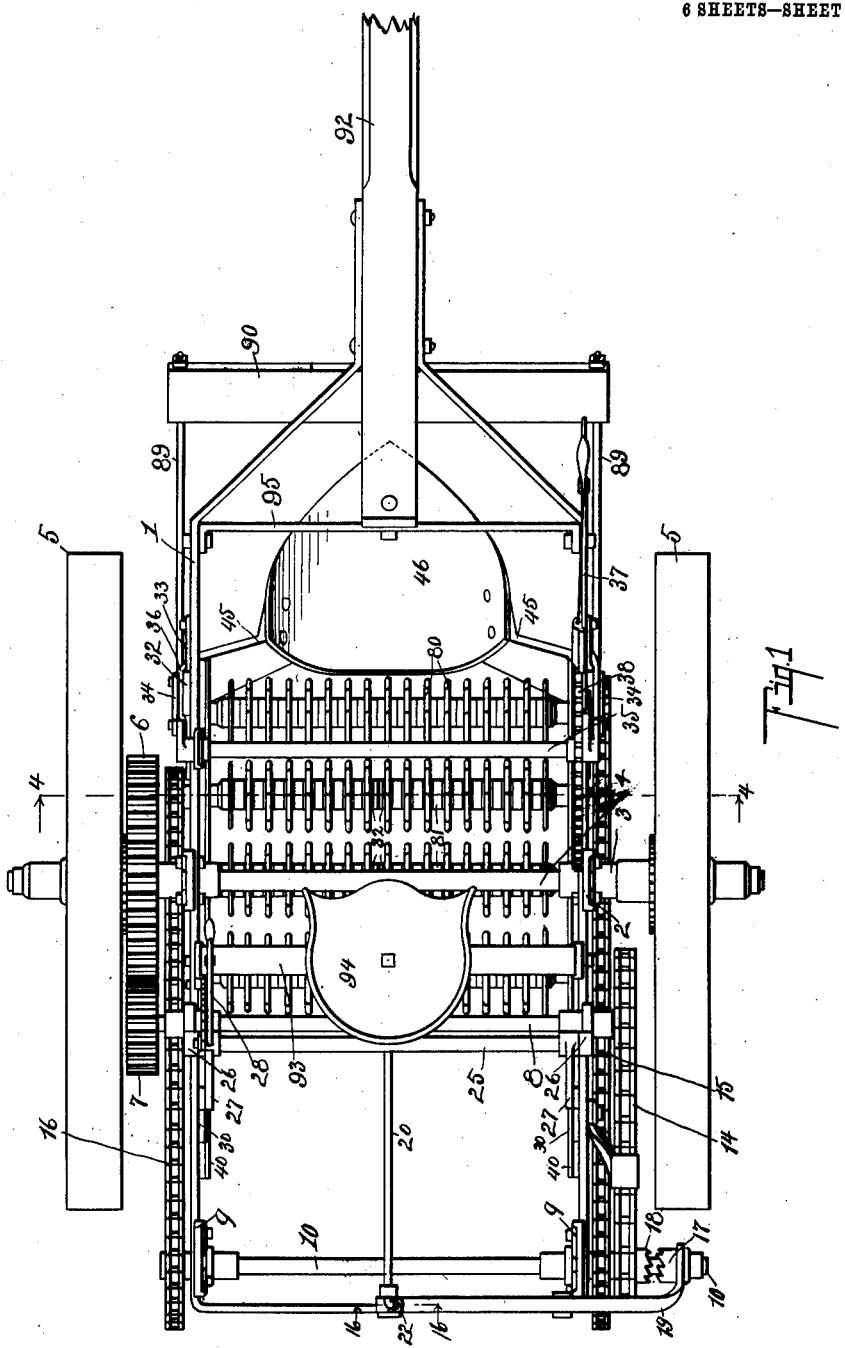
Witnesses:
Inventor,
Charles R. Dodge
By Chappell & Earl
Att'ys

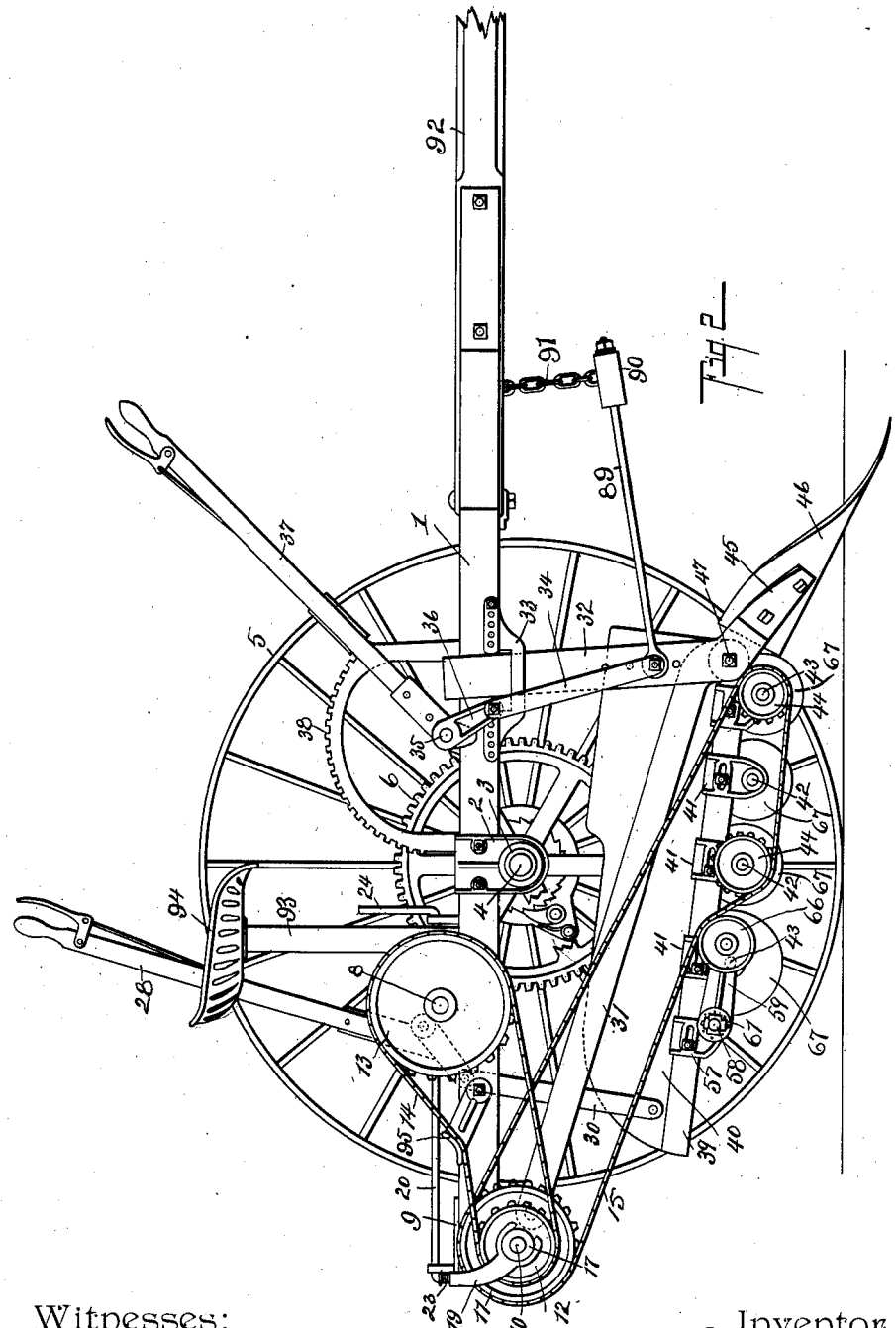

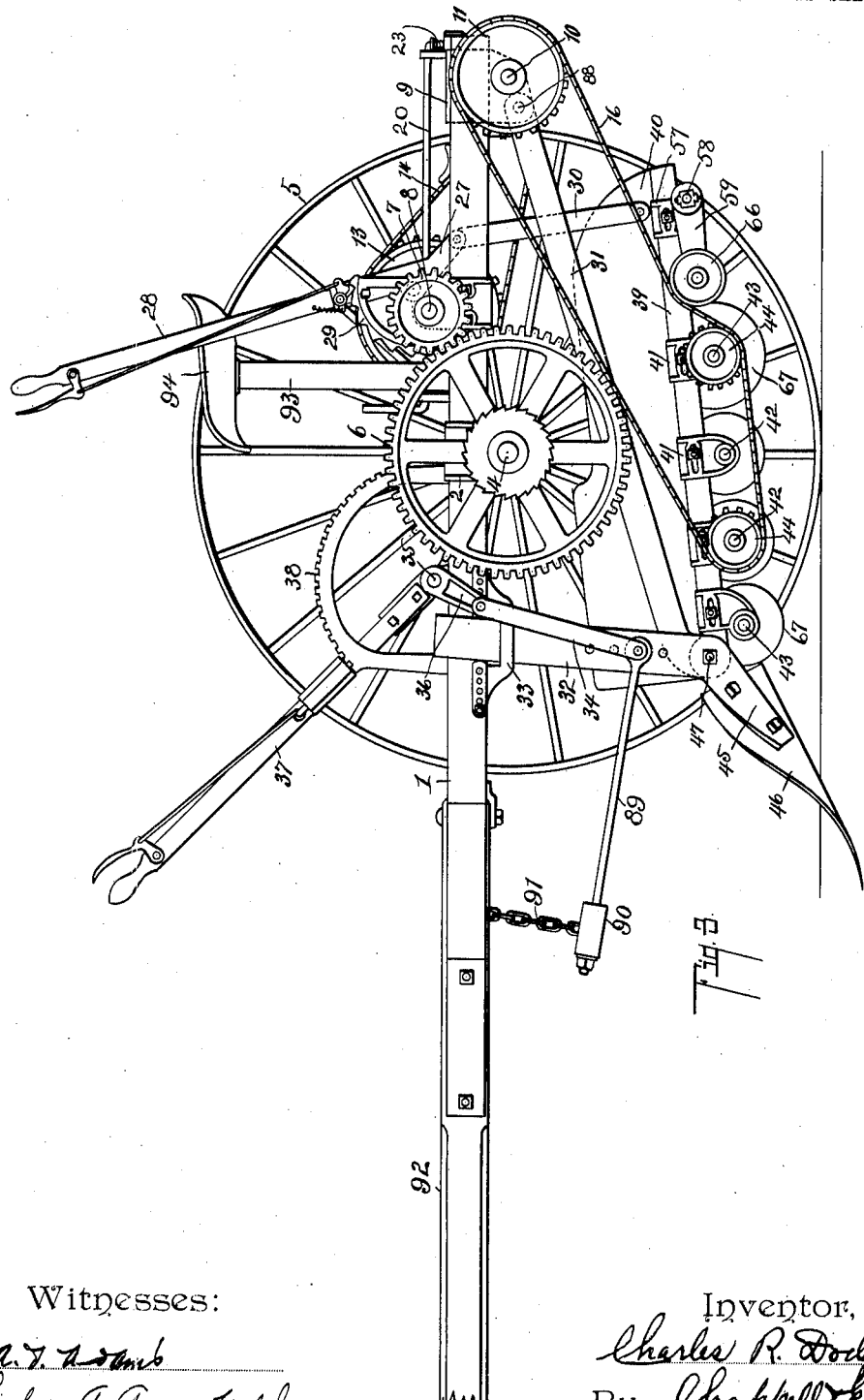

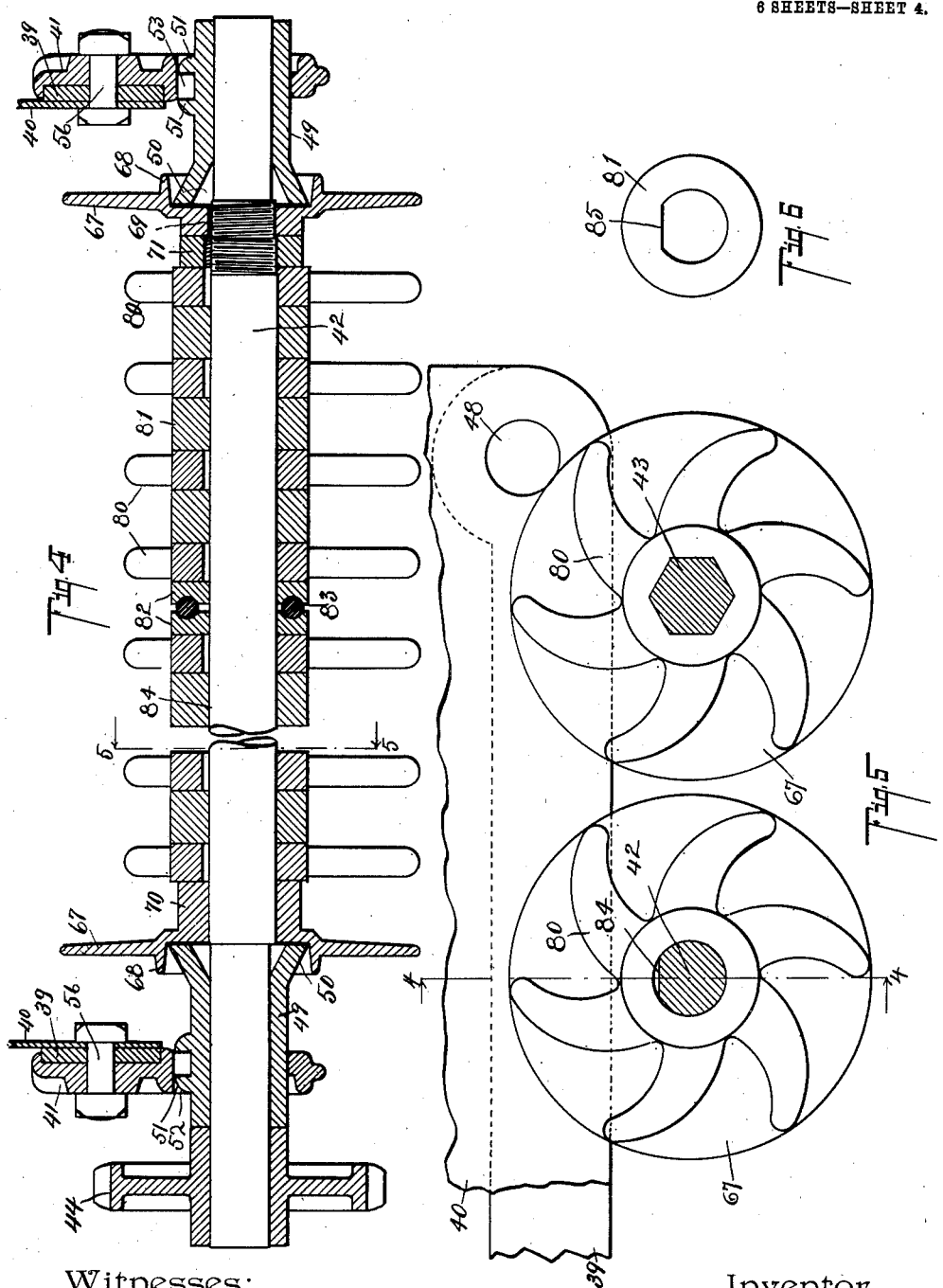

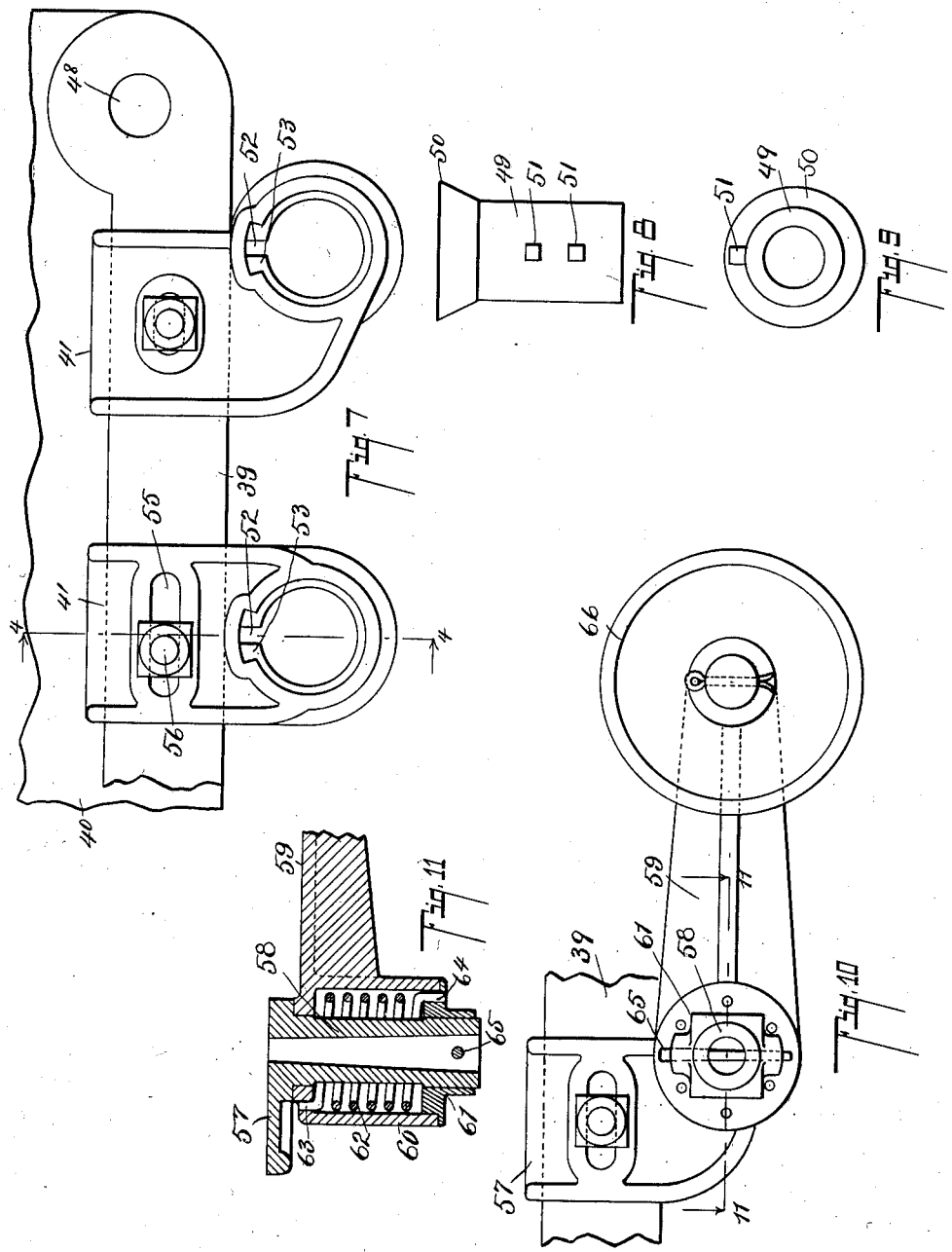

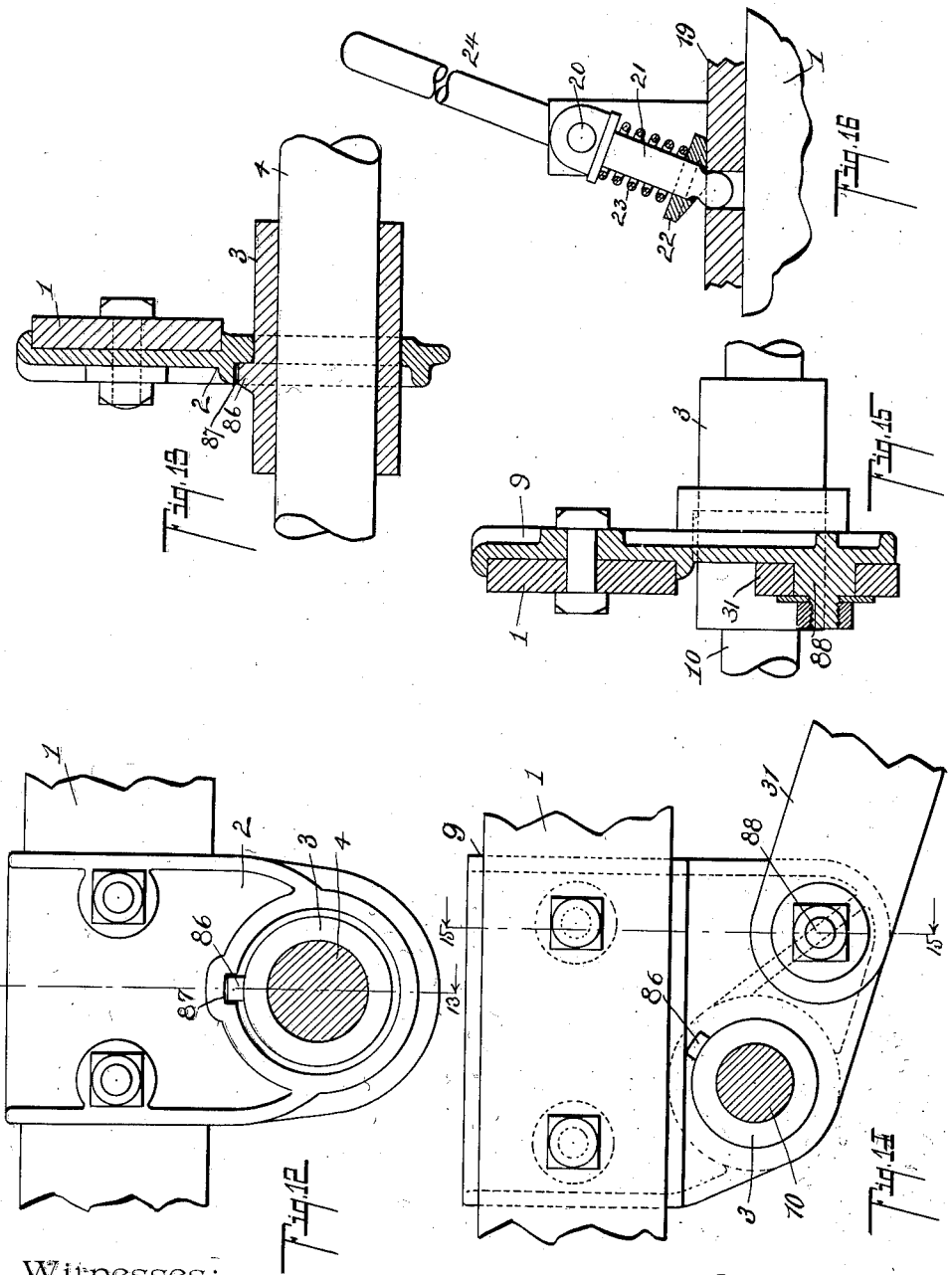

UNITED STATES PATENT OFFICE.

CHARLES R. DODGE, OF CASSOPOLIS, MICHIGAN, ASSIGNOR OF ONE-HALF TO JAMES W. ARMSTRONG AND ADAM E. ARMSTRONG, OF THREE RIVERS, MICHIGAN.

POTATO-DIGGER.

No. 893,905.      Specification of Letters Patent.      Patented July 21, 1908.

Application filed August 27, 1906. Serial No. 332,180.

*To all whom it may concern:*

Be it known that I, CHARLES R. DODGE, a citizen of the United States, residing at Cassopolis, county of Cass, and State of Michigan, have invented certain new and useful Improvements in Potato-Diggers, of which the following is a specification.

This invention relates to improvements in potato diggers.

The objects of this invention are, first, to provide, in a potato digger, an improved means for separating the potatoes from the soil. Second, to provide an improved potato digger adapted for use in all kinds and conditions of soil. Third, to provide an improved potato digger which is of comparatively light draft and easy to operate. Fourth, to provide an improved potato digger in which the bearings are so constructed and arranged as to be protected from the soil.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing forming a part of this specification, in which, Figure 1 is a plan view of my improved potato digger. Fig. 2 is a righthand side elevation with the righthand carrying wheel removed. Fig. 3 is a lefthand side elevation, with the lefthand carrying wheel removed. Fig. 4 is an enlarged detail section taken on a line corresponding to line 4—4 of Figs. 1 and 7, showing the details of one of the separator shafts with fingers thereon. Fig. 5 is an enlarged detail section taken on a line corresponding to line 5—5 of Fig. 4. Fig. 6 is an enlarged plan of one of the washers 81. Fig. 7 is an enlarged detail side elevation showing the hangers for the bearings of the separating finger shafts. Fig. 8 is a plan of one of the bearings 49. Fig. 9 is an end elevation of the bearings shown in Fig. 8. Fig. 10 is an enlarged detail side elevation of the tightener for the driving sprocket chains 15 and 16. Fig. 11 is an enlarged detail taken on a line corresponding to line 11—11 of Fig. 10. Fig. 12 is an enlarged detail section of the main axle showing the hanger and bearings therefor. Fig. 13 is a detail longitudinal section taken on a line corresponding to line 13—13 of Fig. 12. Fig. 14 is an enlarged detail of the rear driving shaft. Fig. 15 is a detail vertical section taken on a line corresponding to line 15—15 of Fig. 14. Fig. 16 is an enlarged section of the clutch lever for the driving shaft taken on a line corresponding to line 16—16 of Fig. 1.

In the drawing, similar reference characters refer to similar views, and the sectional views are taken looking in the direction of the little arrows at the ends of the section lines.

Referring to the drawing, the main frame 1 is preferably rectangular in form and is mounted upon the carrying and driving wheels 5. The axle 4 of these carrying and driving wheels is mounted in suitable bearings 3 carried by the hangers 2 on the main frame 1. The bearings 3 are arranged through suitable openings in the hangers 2 loosely so that they are free to aline themselves. See Figs. 12 and 13. The bearings are provided with lugs 86 and the hangers with notches 87 adapted to receive these lugs to prevent the turning of the bearings in the hangers.

On the axle 4 is revolubly mounted a gear 6. A suitable pawl and ratchet is provided for driving the gear 6 on the forward movement of the digger. Arranged to mesh with this gear 6 is a gear or pinion 7 mounted on the shaft 8 arranged transversely of the main frame 1. Supported in suitable hangers 9 towards the rear of the frame is a transversely arranged shaft 10 which is provided with sprocket wheels 11 at each end which are connected by suitable sprocket chains 15 and 16 to the separating finger shafts as will be later described. The shaft 10 is connected by the sprocket chain 14 to the shaft 8, the shaft 8 being provided with a sprocket wheel 13 and the shaft 10 with a sprocket wheel 12. The sprocket wheel 12 is connected to the shaft 10 by a clutch, the members 17 and 18 of which appear in Fig. 1. This clutch is operated by the rock shaft 20, which is connected to the clutch member 17 by means of the link 19. The rock shaft 20 is provided with a lever 24 and is connected to the link 19 by the arm 21, which has a rounded head engaging in a suitable opening in the link. On the arm 21 is a yielding stop 22, which is held normally downward by the coiled spring 23, these parts clearly appearing in Figs. 1 and 16.

The shovel or plow 46 is carried by standards 32 having inwardly projecting arms 45 to which the shovel or plow is riveted. These standards are slidably arranged through guides 33. These guides are provided with a plurality of holes, so that their position on the frame may be adjusted, thereby adjusting the angle of the shovel or plow.

The shovel standards are pivotally secured by the pivots 47 to the forward ends of the links 31, the links being pivoted on the hangers 9 at the rear end of the frame. These hangers are provided with studs 88 adapted to form bearings for the links 31, the outer ends of the studs being threaded to receive suitable retaining nuts; see Figs. 14 and 15. This permits the raising and lowering of the shovel and also its tilting. The shovel is raised and lowered by means of a lever 37, which is provided with the rock shaft 35 extended across the frame. On this rock shaft are arms 36 which are connected by the links 34 to the standards on each side. A suitable toothed segment 38 is provided for the lever.

The side bars 39 of the separator are pivoted at their forward ends to the standards 32. Carried by these side bars are side plates 40. The rear end of the separator is supported by links 30, which connect the same to arms 27 on the rock shaft 25 of the lever 28, the rock shaft being journaled in suitable posts 26. A suitable toothed segment is provided for this lever. By this means, the rear end of the separator may be raised or lowered.

The shafts 42 and 43 for the separating fingers are carried by hangers 41 which are adjustably secured to the side bars by means of suitable bolts arranged through horizontal slots in the hangers. By this means, the hangers may be adjusted to bring the shafts in proper relation. On these shafts 42 are separating fingers 80. These fingers preferably project from suitable hubs by means of which they are effectively mounted on the shafts. The shafts 43 are preferably polygonal and the hubs of the separating finger are made to fit the same so that they are secured to the shafts to revolve therewith. The shafts 42 are round with a flattened portion 84 at one side. Between the hubs of the separating fingers on these shafts 42 are washers 81 shaped at 85 to fit the flattened portion of the shafts whereby they are secured thereto to revolve therewith and permitted to move longitudinally thereon. These parts are so arranged that the separating fingers on the shafts 42 are ordinarily revolved therewith on account of the friction thereon. However, should the same become wedged, as by a stone, the shaft may revolve independently thereof thereby preventing breakage and the remaining fingers on the shaft are not affected thereby. The fingers are preferably curved rearwardly so that the vines, potatoes, stones, and the like are readily delivered therefrom. To secure the desired friction, I substitute for one of the washers 81 a pair of washers 82 having facing annular grooves. In these grooves, I arrange a ring 83 preferably of rubber. The adjustment of the friction is secured by the lock nut 71 which is threaded upon the shaft. The disks 67 are provided with right hand threads and the nuts 71 with left hand threads so that they are locked in position.

The shafts are driven by sprocket chains 15 and 16, the sprocket chain 15 driving the first or front and third shafts and the sprocket chain 16 driving the second and fourth shafts.

The shafts are provided with sprocket wheels 44 which are suitably keyed thereto. The sprocket chains 15 and 16 are driven from the shaft 10, the drive connections of which have been heretofore described. By means of the levers described the incline of the separator may be regulated to suit the particular requirements, i. e., in a moist clay soil, for example, the rear end of the separator should be elevated more than for a sandy soil or a dry loam. In a sandy soil it is advisable that the forward shafts be arranged so as to bring the ends of the fingers close together, while in a heavy soil or in a wet soil, it may be desirable to have the forward shafts further separated. It is evident that the separator is capable of complete adjustment, also that the inclination and depth to which the shovel is run is under perfect control.

The bearings 49 for the shafts 42 and 43 are preferably detachably arranged in the hangers, being provided with retaining lugs 51, as shown in Figs. 8 and 9, and the hangers with slots 52 through which the lugs may be inserted. After inserting the bearings in the hangers, they may be turned in either direction to secure them in position, the hangers having cut away portions 53 to receive the lugs. By this arrangement, a simple attaching means is provided and a pivoted hanger secured for the bearings so that they readily aline themselves. This obviates the requirement for great accuracy in construction.

The inner ends 50 of the bearings are flared outwardly and are protected by annular flanges formed on the shield or guard disks 67. These shield or guard disks are arranged at each end of the shafts and prevent the vines, etc., from becoming entangled in the bearings and also shield the same from dirt.

I preferably arrange the shafts having fixed fingers at the outside and those having the loose fingers in the center. They may, however, be arranged alternately, if desired.

As the tension on the driving chains 15 and 16 varies with the raising and lowering of the rear end of the separator, I provide tighteners therefor. These preferably consist of a wheel 66 arranged to engage the chain, the wheel being carried on an arm 59. This arm 59 is journaled on a stud 58 projecting from the hanger 57, the hanger being carried by the side bar 39 of the separator. The arm 59 is provided with a hollow hub in which is a coiled spring 62, one end 63 of the coiled spring engages the hub of the arm and the other 64 engages the cap 61 which is secured to the stud or spindle by a suitable pin 65. There is sufficient tension on this spring to take up any slack there may be in the chains. The chain 14 is provided with a tightener 95 of the common form. The team is preferably hitched to the draft bar 90 which is connected to the standard 32 by suitable links 89, the draft bar being suspended from the pole 92 by the chain 91. The draft bar is adjustably connected to the standards so that the proper line of draft may be secured. The operator occupies the seat 94 which is carried by the standard 93, the same being arranged so that the operating levers are in convenient reach.

By arranging the parts as I have illustrated and described, I secure a potato digger which is very convenient to operate and may be operated with comparative ease. The same may be adjusted according to the soil in which it is to operate, which is a very desirable feature.

I have illustrated and described my improved potato digger in detail in the form preferred by me, although I am aware that it is capable of considerable variation in structural detail without departing from my invention.

Having thus described my invention, what I claim as new and desire to secure by Letters Patent is:

1. In a potato digger, a separator comprising an adjustably supported frame; separator finger shafts adjustably mounted on said frame whereby they may be adjusted toward and from each other; and fingers arranged on said shafts, the fingers of a part of the shafts being secured to revolve therewith, and of the others being revolubly mounted thereon, and having a frictional connection therewith, whereby they are normally revolved with the shaft, the shafts having the fixed fingers and those having the loose fingers being arranged adjacent.

2. In a potato digger, a separator comprising an adjustably supported frame; separator finger shafts mounted on said frame; and fingers arranged on said shafts, the fingers of a part of the shafts being secured to revolve therewith, and of the others being revolubly mounted thereon, and having a frictional connection therewith, whereby they are normally revolved with the shaft, the shafts having the fixed fingers and those having the loose fingers being arranged adjacent.

3. In a potato digger, a separator comprising the separator finger shafts adjustably mounted on said frame whereby they may be adjusted toward and from each other; and fingers arranged on said shafts, the fingers of a part of the shafts being secured to revolve therewith, and of the others being revolubly mounted thereon, and having a frictional connection therewith, whereby they are normally revolved with the shaft, the shafts having the fixed fingers and those having the loose fingers being arranged adjacent.

4. In a potato digger, a separator comprising the separator finger shafts; fingers arranged on said shafts, the fingers of a part of the shafts being secured to revolve therewith, and of the others being revolubly mounted thereon and having a frictional connection therewith, whereby they are normally revolved with the shaft, the shafts having the fixed fingers and those having the loose fingers being arranged adjacent; means for adjusting the friction of said revolubly mounted fingers; and disks mounted on said shafts, said fingers being arranged on said shafts between said disks.

5. In a potato digger, a separator comprising the separator finger shafts; fingers arranged on said shafts, the fingers of a part of the shafts being secured to revolve therewith, and of the others being revolubly mounted thereon, and having a frictional connection therewith, whereby they are normally revolved with the shaft, the shafts having the fixed fingers and those having the loose fingers being arranged adjacent; means for adjusting the friction of said revolubly mounted fingers.

6. In a potato digger, a separator comprising the separator finger shafts; fingers arranged on said shafts, the fingers of a part of the shafts being secured to revolve therewith, and of the others being revolubly mounted thereon, and having a frictional connection therewith, whereby they are normally revolved with the shaft, the shafts having the fixed fingers and those having the loose fingers being arranged adjacent; and disks mounted on said shafts, said fingers being arranged on said shafts between said disks.

7. In a potato digger, a separator comprising the separator finger shafts; and fingers arranged on said shafts, the fingers of a part of the shafts being secured to revolve therewith, and of the others being revolubly mounted thereon, and having a frictional connection therewith, whereby they are normally revolved with the shaft, the shafts having the fixed fingers and those having the loose fingers being arranged adjacent.

8. In a potato digger, a separator comprising the separator finger shafts; fingers arranged on said shafts, the fingers of a part of the shafts being secured to revolve therewith, and of the others being revolubly mounted thereon, and disks mounted on said shafts, said fingers being arranged on said shafts between said disks.

9. In a potato digger, a separator comprising the separator finger shafts; and fingers arranged on said shafts, the fingers of a part of the shafts being secured to revolve therewith, and of the others being revolubly mounted thereon.

10. In a potato digger, a separator comprising finger shafts; fingers arranged on suitable hubs revolubly mounted on said shafts; washers arranged between the hubs and fixed to the shafts; friction washers having annular grooves in their meeting faces; friction rings in said grooves; and means for adjusting the parts.

11. In a potato digger, a separator comprising finger shafts; fingers arranged on suitable hubs revolubly mounted on said shafts; washers arranged between the hubs and fixed to the shafts; and means for adjusting the parts.

In witness whereof, I have hereunto set my hand and seal in the presence of two witnesses.

CHARLES R. DODGE. [L. S.]

Witnesses:
CLARENCE M. LYLE,
EDWARD J. RUSSEY.